June 9, 1931. J. LEDWINKA 1,808,960
VEHICLE BODY CONSTRUCTION
Filed Sept. 29, 1924 4 Sheets-Sheet 4

INVENTOR.
JOSEPH LEDWINKA
BY

ATTORNEY.

Patented June 9, 1931

1,808,960

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

VEHICLE BODY CONSTRUCTION

Application filed September 29, 1924. Serial No. 740,425.

My invention relates particularly to the side frame construction of pressed steel automobile bodies of the closed body type, such as the sedan and the coupé. That it has other adaptations, however, will be quite apparent upon an understanding of it. It comprehends that portion of the body structure involving the side sill, the toeboard support connected to the front extremity of the side sill, the body posts which are erected upon it, the seat supports which are associated with it, tonneau sills and the means by which they are connected with the side sills, together with the doors of the body. This structure with the exception of the doors may be called the side frame of the automobile body. In the structure of the side frame and the doors, however, reside some of the some difficult problems which have confronted the body engineer. The beauty of a car has been judged largely by its side elevation. Its commodiousness has depended largely on the relative arrangement of its side frame structure, doors and interior structure. At the same time, the doorways have always been and will always continue to be the greatest source of weakness in automobile body construction, inasmuch as such a thing as cross-bracing within that area is impossible. These conditions combinedly have imposed complexities and irregularities of side frame and door construction which have made automobile bodies difficult and expensive to construct, and heavy in weight, and it has very rarely been possible to obtain in full one desired end without sacrificing another. The construction I have evolved enables me to attain all of these objects far more fully than has ever before been possible.

The keystone of the construction is a body side sill of peculiar section to which the combined and co-acting parts, e. g., posts, doors, etc., may be most simply adapted and connected. This sill is of double or compound Z-section, the outer Z of the section being disposed horizontally with one arm pointing downwardly and inwardly and the inner Z being disposed vertically with its upper arm joining the upper arm of the outer Z and its lower arm extending inwardly of the body of the car. And not only does this construction admit of the simplifying and strengthening of the structure of conjoined and co-acting parts, but it makes it possible to carry the door line of the car to the very bottom of the body creating one of the most pleasing designs which has ever been evolved.

In the accompanying drawings, those several embodiments of this construction at large which are at this time best known to me are illustrated.

Figure 5ª is an enlarged detail of the forward end of the sill in top plan view;

Figure 5ᵇ is also an enlarged detail of the forward end of the sill, but in side elevation;

Fig. 8 is a side elevation of the toeboard support and its structural connections to the sill.

Figs. 9 and 10 are cross-sections of this member upon lines 9—9 and 10—10 respectively of Fig. 8.

Figs. 15 and 16 are elevation and plan respectively of a modified form of structure including the side sill and conjoined post D bracket and tonneau sill, while Fig. 17 is a vertical section taken on line 17—17 of Fig. 15.

The automobile body illustrated is of the sedan type in which there are provided adjacent front and rear doors 20 and 21 which close toward each other upon an intermediate door post 22. The front door 20 gives access to the front seats while the rear door 21 gives access to the rear seats of the body. The post 22 between them is commonly known as B and C post, the front post 23 being commonly known as the A post and the rear post 24 being commonly known as the D post. The front door 20 is hinged to the front or A post 23 while the rear door is hinged to the rear or D post 24. Both doors lock upon the B and C post 22. These posts 22, 23 and 24 are erected upon body side sill 25. The front end of the body comprising the cowl 26 is related to the side frame structure so far described through toeboard support 27 shown in dotted lines in Fig. 1 and through the A post 23. The rear or tonneau section of the body 27' is related to the structure through the D post 24 and two members 28 and 29 conjoined to sill 25 and respectively known as the tonneau side sill and the post-D bracket. This structure, with the exception of the doors, might be termed the side frame of the body.

Figures 5, 6, 7, 11, 12, 13:
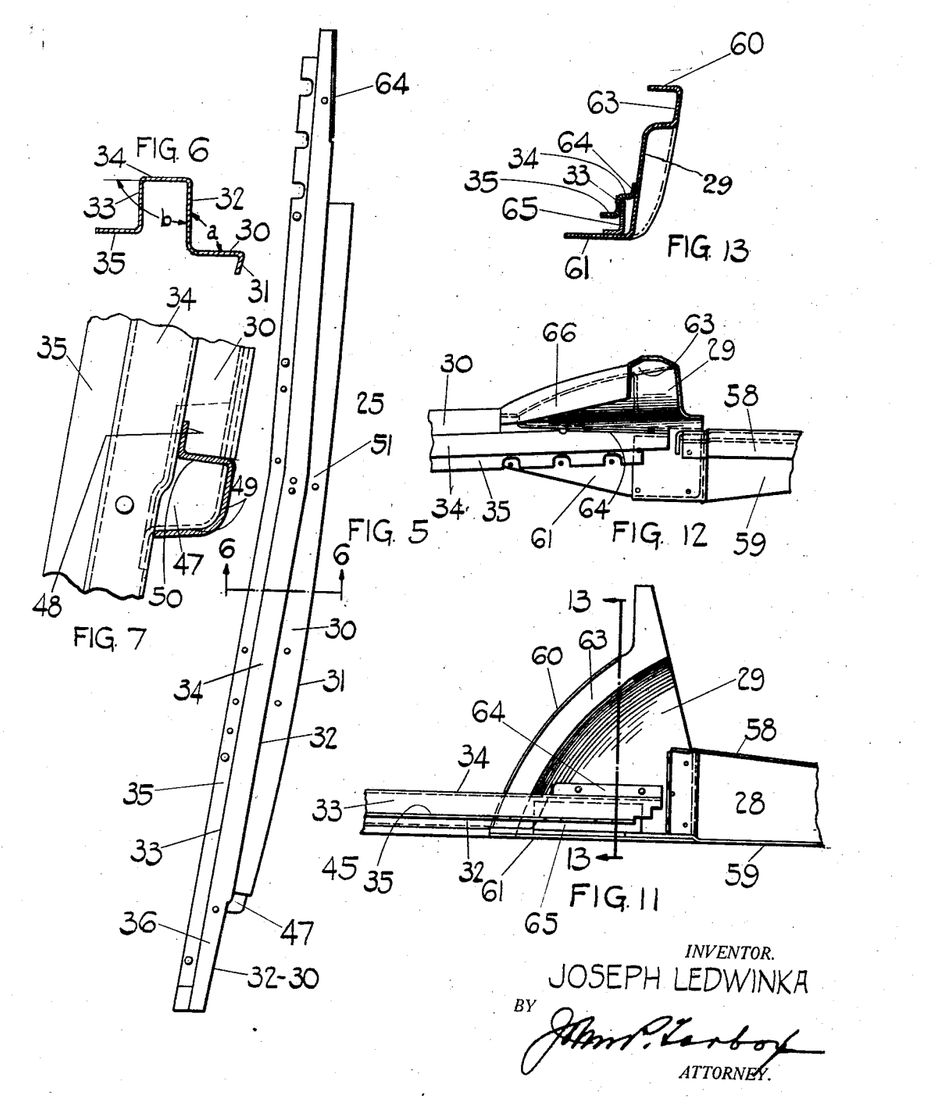
Fig. 5 is a longitudinal plan view of the body sill itself.
Fig. 6 is an enlarged transverse section thereof on lines 6—6 of Fig. 5.
Fig. 7 is an enlarged plan view of a portion of the front end of this sill.
Figs. 11 and 12 are elevation and plan respectively of the side sill and the conjoined post D bracket and the tonneau sill, the elevation being taken from the inside.
Fig. 13 is a section on line 13—13 of Fig. 11.

In Figs. 5 and 6, the double or compound Z section of the sill 25 which forms the keystone of this construction is clearly shown. In the full utilization of the advantages of this sill, its structure may be variously described, but I shall use those terms which lend themselves more readily to those phases of my invention which pertain to the conjoined parts. The outer Z of the section shown in Fig. 6 is composed of a body web 30 and outer and inner arms 31 and 32 respectively. The outer arm 31 points downwardly and inwardly, while the inner arm 32 extends upwardly and forms with the web 30 of the Z an angle section *a* presenting outwardly and upwardly of the body. The inner Z of the section is composed of web 33 and upper arm 34 and lower arm 35. Upper arm 34 joins arm 32 of the outer Z section and with it forms an angle section *b* presenting inwardly and downwardly of the body. Upper arm 32 of the outer Z section, upper arm 34 of the inner Z section and body web 33 of the inner Z section together constitute a transverse section of inverted channel shape. The web 33 of the inner Z is of less height than the arm 32 of the outer Z, giving the channel 32—33—34 channel walls of different height. The inner arm 35 of the inner Z extends laterally and interiorly of the body and is in the form of a simple flange on the inner channel wall 33. The web 30 of the outer Z may, from the same standpoint, be regarded as a laterally and outwardly extending flange on the outer channel wall.

This side sill is of considerable length as indicated in Fig. 5 and intermediate its ends is bent to the angle between the inner faces of the bodies of the doors. The inner flange 35 of the sill is of substantially uniform width throughout the length as is also the width of the channel 32—33—34. The outer flange 30, however, is of varying width, its outer edge being contoured to correspond to the contour of the lowermost longitudinal line of the body and also with the outer contouring of the lower edges of the doors of the body. The heights of the side walls of the channel 32—33—34 are substantially uniform throughout the length of the sill.

Figures 8, 9, 10, 15, 16, 17:
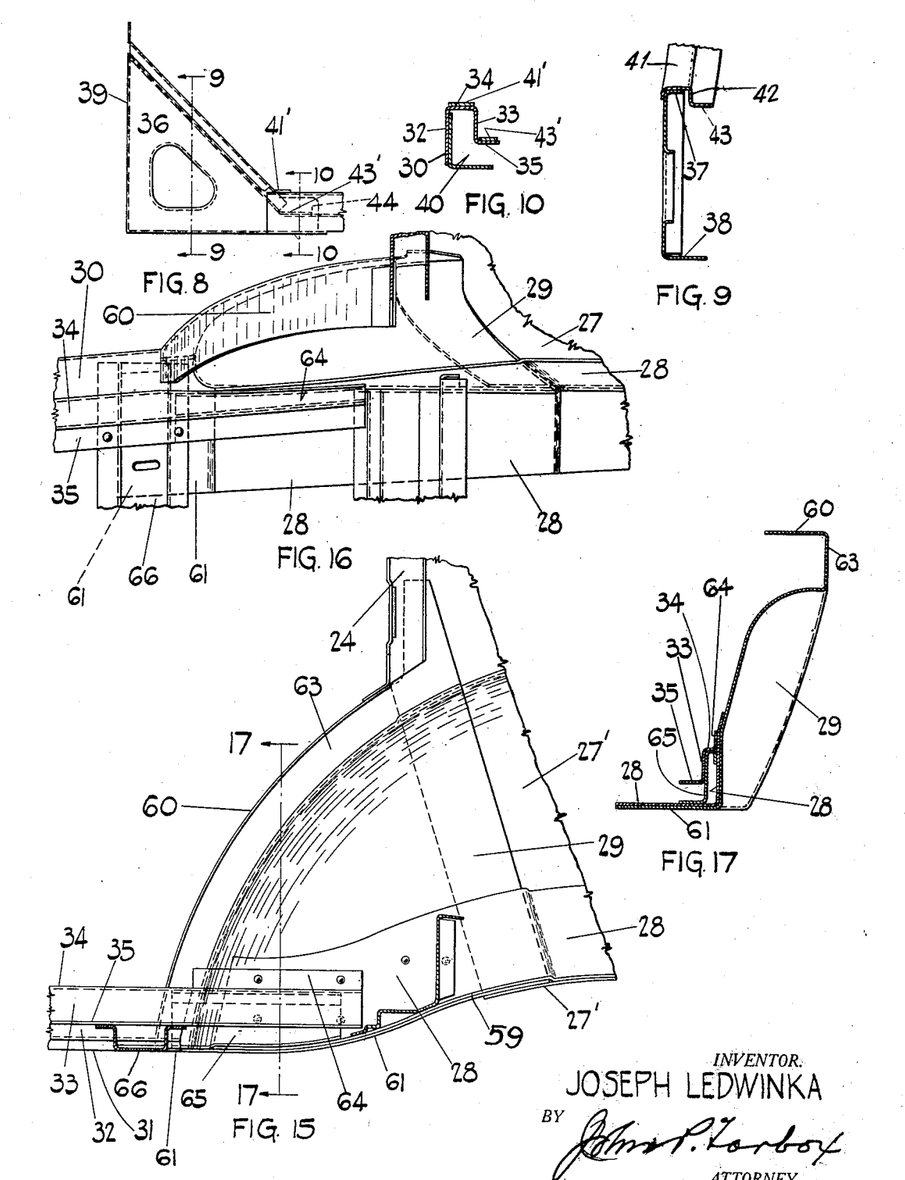

The toeboard support 27 which is connected with the front end of the sill 25 is shown in Figs. 8 to 10. It comprises a triangularly shaped main body 36, provided with interiorly extending flanges 37 and 38 at the top and bottom, respectively, and a similar flange 39 on the front end. Secured by its upper and outwardly extending arm 41 to the upper flange 37 is a depending auxiliary flange member of Z section 41—42—43 which depends from flange 37. The outer flange 30 at this end of the sill is cut in and downturned so that it forms a plane continuation of the channel wall 32 as is indicated in Fig. 10. The body 36 of the toe-board support 27 is extended at 44 inwardly of the channel 32—33—34 of the side sill and spot-welded to the outer side wall thereof and to downturned branch 30 forming a downward continuation of side wall 32. The upper arm 41 of the depending flange member 41—42—43 is extended rearwardly to overlap at 41' the bottom 34 of the channel 32—33—34 of the sill, while the inner and lower arm 43 of this depending flange member is likewise extended rearwardly at 43' to overlap the top of the inner flange 35 of the side sill. Preferably, the width of arms 41 and 43 is the same as the width of the arms 34 and 35 whereby the angle section defined by elements 33 and 35 of the sill section is prolonged in the toeboard support. All the overlapped parts are welded in place. In the completed body, the floor and toeboards are supported by the flange 35 and its extension 43.

Near the point of juncture of toeboard 37 with the sill 25 there is erected the A post 23. This post is erected in the angle *a* of the outer portion of the sill section with its bottom substantially in the plane of the branch 30 of the angle. At this point, the branch 30 of the section is cut away as shown clearly at the bottom of Fig. 5 and in Fig. 7, and there is provided projecting forwardly from the terminus of branch 30 a flanged reinforcing plate 47 welded or riveted to the extremity of branch 30 on its under side and to branch 32 on its inside, and having a contour corresponding to the interior contour of the section of post 23. Post 23 is of channel section with the mouth of the channel presenting inwardly of the body. On its rear side wall there is provided an integral ear or flange 48 spot-welded to the upper branch 32 of the angle section $a$ of the sill section. The bottom and side walls of the end of the post are extended downwardly as indicated at 49 a distance corresponding approximately to the length of the outermost arm 31 of the sill section and extends the same forwardly around the downturned flanges of reinforcement 47. Preferably, these extended walls 49 are welded to the strip 47 to close the bottom of the post section to present a finished appearance of the foot of the post. The forward side wall of the post is gas-welded to the outer side wall 32 of the channel section of the sill as indicated at 50.

The B and C post member 22 is also erected in the angle $a$ of the section of the sill but at or near the bend 51 in the sill. This post, too, is of channel section presenting inwardly. The side walls 52 at their bottom ends are provided with lateral flanges or ears 53 welded to the upper wall 32 of the angle $a$. In case of the front side wall 52 (see Figs. 3 and 4), the flange or ear 53 is extended upwardly to overlap and be welded to the side wall of seat support 54 which is mounted upon the top of sill member 25, being preferably welded to the bottom 34 of the inverted channel section 32—33—34 (see Figs. 1 and 14). Flange 53 thus not only assists in securing the seat support 54 in place, but the seat support in turn assists in strengthening the connection of the post 22 with the sill. The bottom of the post abuts the lower branch of angle section $a$, is of substantially the same width as this lower branch 30, and the ends of both the side walls 52 and the bottom wall 55 of the channel section are gas-welded to branch 30. Interiorly, the post is reinforced by a lining 56 in general also of channel section. This lining is deflected laterally of the length of the post and is secured to branch 34 of the sill section in a manner to brace the post. A reinforcing strip 57 of limited length is nested within the lower part of lining 56 and reinforces the lining and strengthens the deflected portion in its bracing action. Branch 34 of the sill section, it will be noted in Fig. 6, constitutes the upper branch of the angle $b$ and also the upper arm of the inner Z portion 33—34—35.

At the rear end of the sill 25 (the upper end shown in Fig. 5) there are conjoined in the longitudinal extension thereof two additional side frame members. These are the post D bracket 29 and the tonneau side sill 28. Referring to the form shown in Figs. 11 to 13, the tonneau side sill is of channel section comprising a body web 28 and upper and lower flanges 58 and 59. The post D bracket 29 in elevation is of substantially triangular form but in cross section as shown in Fig. 13 is also of channel section, being provided on its upper edge with the flange 60 and on its lower edge with the flange 61. The body portion 29 of this post D bracket viewed from the outside (which is to say the right of Fig. 13) is of re-entrant form and of a contour adapted to form an extension of the wheel-housing 62 of the body. Between the re-entrant body 29 and the upper flange 60 is constituted a subordinate channel section 63 which receives the lower end of the D post 24 and its downward extension constitutes a jamb for the lower rear part of the door.

Characteristically, however, both the post D bracket 29 and the tonneau side sill 28 have cross sections the lower portion of which is of angle form being comprised in the one case of body 29 and inwardly extending flange 61 and in the other case of body web 28 and inwardly extending flange 59. This angle section of tonneau sill 28 is nested within the corresponding section of post D bracket 29, and web 28 is welded to body 29 as clearly indicated in Figs. 11 and 12. Moreover, bottom flange 59 of tonneau sill 28 is extended forwardly to overlap to a greater extent than the web 28, the lower flange 61 of the post D bracket, and is also welded in place in this overlapped relation. Still further, and characteristically, the angle section of the post D bracket 29 underlies the inverted channel section 32—33—34 of the side sill. The outer wall 32 where the sill 25 is overlapped by the post D bracket is turned outwardly and upwardly to form an upwardly extending flange 64 which is welded to body 29. The inner wall 33 of the channel 32—33—34 is in its turn connected with the flange 61 of bracket 29 by an intermediate angle 65 which like the angle of the bracket 29 presents upwardly and inwardly and has its upper branch welded to the inner wall of the channel section of the sill and its lower branch welded to the flange 61 of the bracket. This member may also be welded to the forward extension of flange 59 of the tonneau sill 28 if desired.

In Figs. 15 to 17 I have shown a modification of the post D bracket and tonneau sills which are conjoined to the side sill. The members include a "kick-up". In this modification, both the vertical web 28 and the flange 59 are extended forwardly, the web 28 to lie between the flange 64 of the side sill and the body 29 of the bracket, and the flange 59 to lie between the lower branch of connecting member 65 and the flange 61 of the bracket. The nesting of the channel 32—33—34 within the angles of members 28 and 29, and the welding of the parts together in this triply overlapped relation effects a simple yet extremely strong joint. Preferably, also, the flanges 59 and 61 are extended still farther forwardly and one of them at least is extended all the way and secured to cross brace 66 interconnecting side sills on opposite sides of the body.

Figures 5A, 18:
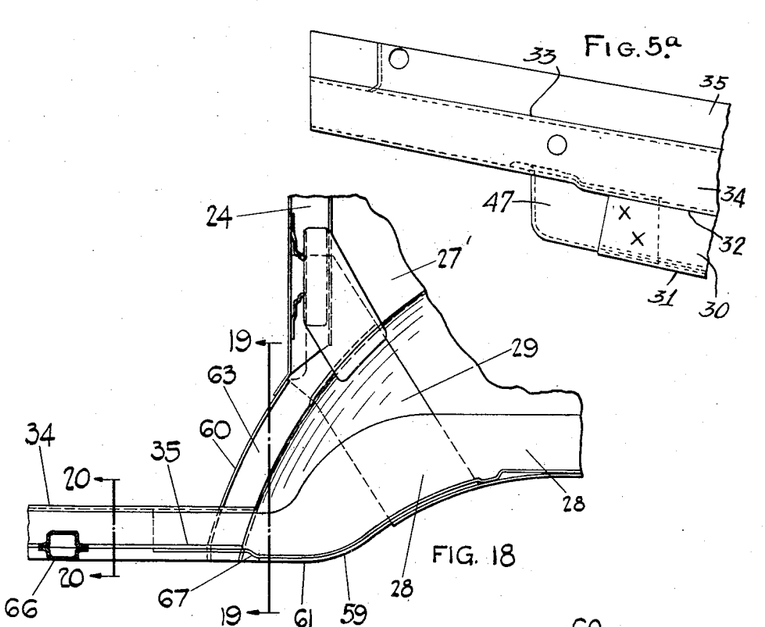
Fig. 18 is an inside elevation of a still further modification of sill, post D bracket and tonneau side sill.
Figure 5B:
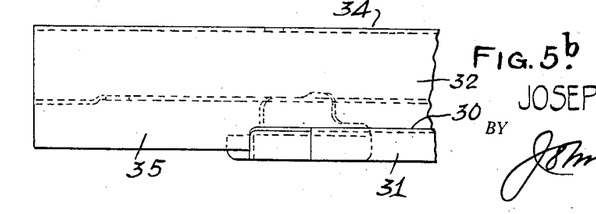
Figure 19:
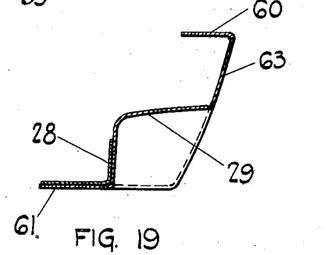
Figs. 19 and 20 are vertical sections taken on lines 19—19, and 20—20 of Fig. 18.
Figure 20:
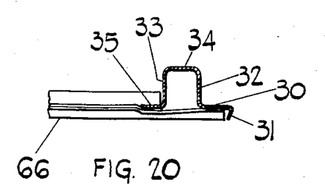

Still a third modification is shown in Figs. 18 to 20. In this case, as in the second case, the tonneau sill 28 and bracket 29 are bent to constitute the "kick-up". Tonneau sill 28 is of angle section rather than the channel section. Its angle section is nested within the angle section of the bracket 29 throughout the length of the bracket, but the tonneau sill 28 is extended forwardly of the bracket and receives nested within it the channel section 32—33—34 of side sill 25. The side sill terminates at the inner wall of channel 63 of bracket 29 and in this case does not extend into overlapped relation with the body 29 of the bracket. The outer wall 32 instead of being turned outwardly and upwardly as in the two previous cases is not deflected but simply welded to the web 28 of the tonneau side sill. Moreover, the connecting member 65 is, in this case, omitted and the bottom flange 59 of the tonneau sill deflected upwardly as shown at 67 and welded to the inner flange 35 of the sill 25.

Figures 1, 2, 3, 4, 14:
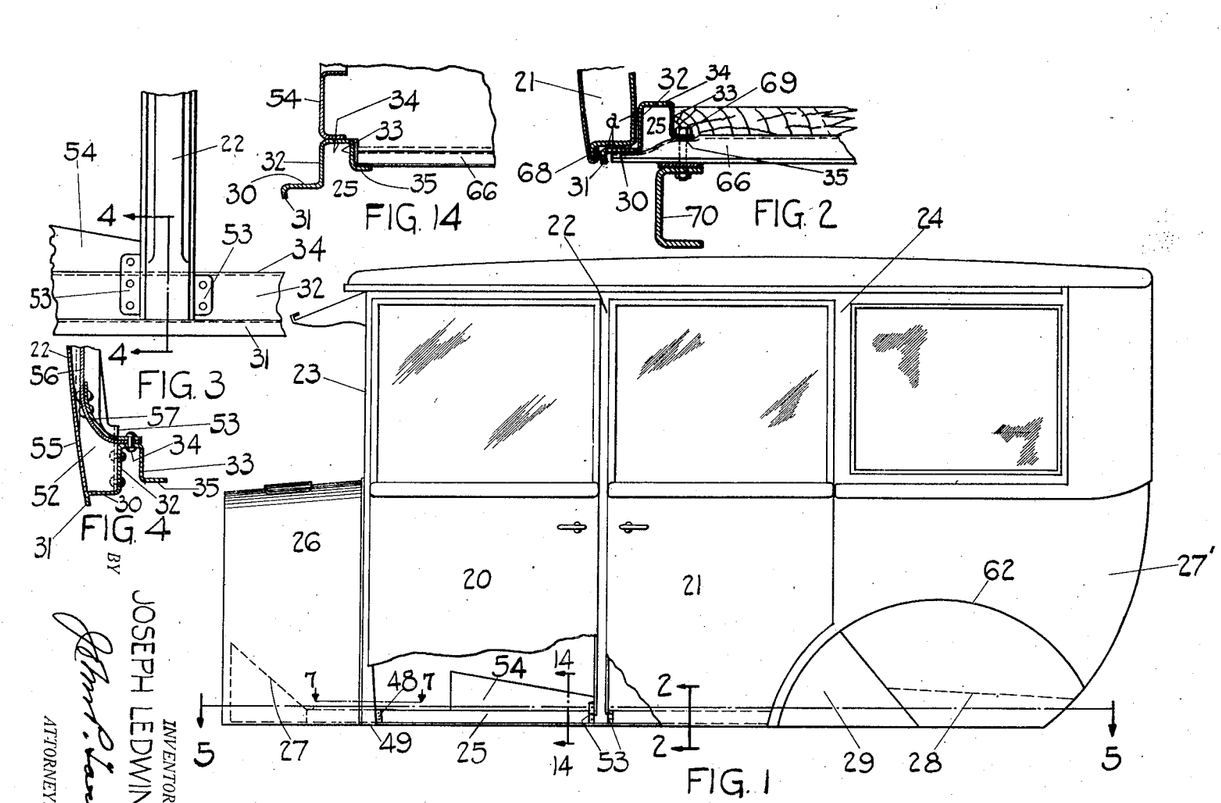
Fig. 1 is a side elevation of a body in which these inventions have been incorporated.
Fig. 2 is a section of a body sill and the lower portion of the door taken on line 2—2 of Fig. 1.
Fig. 3 is an enlarged elevation of an intermediate length of a body sill and a door post which has been erected thereon.
Fig. 4 is a transverse section of this body sill and the lower portion of the post taken on line 4—4 of Fig. 3.
Fig. 14 is an intermediate section of the side sill taken on line 14—14 of Fig. 1 and showing the relation of the sill to the seat support.

This structure constitutes the frame for the side of the car. In it as outlined in the beginning, are mounted the doors 20 and 21. Fig. 2 is a section taken through the lower part of a door and transversely through the sill 25 and a portion of the chassis of the vehicle. The body of the door at its bottom is of substantially the width of the flange of branch 30 of angle $a$ of the section of the sill. It is received when the door is closed and fits within this angle. It is provided with downwardly extending overlap 68 overlapping and lying adjacent the outermost branch of the sill section 31, and is of substantially the same extent.

Sill 25 is shown mounted upon cross brace 66 of which, it will be understood, there are a plurality in each car. This cross brace is of a normal section of a height substantially equal to the difference in height between the inner and outer portions of the sill section. Its outermost end is deflected and reduced in height to be accommodated beneath branch 30 of the section within the length of branch 31. Branches 30 and 35 of the section which constitute the flanges of the inverted channel 32—33—34 are preferably welded or otherwise secured to the cross brace 66. This brace itself is preferably of flanged channel section or the equivalent and the flanges 30 and 35 are preferably welded to the flanges or webs of the brace. Through the brace 66, the body is bolted as indicated at 69 to the sill 70 of the chassis of the vehicle upon which the body is to be used.

The foregoing specific description has clearly indicated the advantages present in a body constructed in accordance with the invention. The sill construction attains simplicity and strength. Its channel formation renders it adaptable for coaction with and expeditious inter-connection to the other elements, since access for welding is afforded. Some of its parts serve several functions, thereby reducing the number thereof, the cost of construction, the time and labor required in assembly, and the weight of the body. The formation of the toe-board support enables a plurality of easily effected strong overlapped joints to be made between it and the sill. The flanged outer channel wall of the sill furnishes broad vertical and horizontal seats for the butts of the posts and an expansive surface for welding the joints therebetween, thus providing strong but neat and simple joints. Further provision for strong overlapped joints and effective structural grouping thereof is seen in the cooperative nesting of the side sill, post D-bracket and tonneau side sill. This provision includes a multiple wall box girder formation and the effective tying in of this structure to the cross frame structure of the body. The sill forms the thresholds of the doorways and accommodates the bottom portions of the doors. The doors are, therefore, extended to the bottom of the structure. This imparts a regularity and smoothness to the lines of the car, resulting in an improvement of its design.

As the invention is basic, it will be found capable of an unusually large number of modified and different embodiments without departing in any wise from its generic spirit. The terminology of the annexed claims is directed, as far as the development of my invention now known to me serves as a guide, to the inclusion of all such embodiments and modifications.

What I claim is:

1. A side sill for vehicle body frames having an inverted channel section, the outer wall of which is extended in the form of an angle section facing inwardly and downwardly whereby the sill forms the thresholds, the lower abutments for the doors, and a finish strip for the lower edge of the body.

2. A side sill for vehicle body frames having a section in the form of an inverted channel, the outer wall of which is extended by an angle section presenting downwardly and inwardly, and the inner wall of which is shorter than the outer wall and is provided with a laterally and interiorly extending extension.

3. In a vehicle body frame in combination, a side sill having a cross section of inverted channel shape and a flanged toeboard support in longitudinal extension on one end of said sill, the body of which support is secured to a side wall of the channel section, and a flange of which support is secured to the bottom of said channel section.

4. In a vehicle body frame in combination, a side sill of a cross section the inside portion of which is of Z form, and a toe-board support in longitudinal extension of said sill provided with a flange extension also of Z section, the arms of which are secured to the arms of the Z section of the sill.

5. In a vehicle body frame in combination, a side sill of inverted channel shape in cross section, the inner wall of which is extended laterally and interiorly of the body, and a toeboard support in extension of said side sill, which support is provided with a flange extending laterally and interiorly and constituting a longitudinal continuation of the extension of the sill section.

6. In a vehicle body frame in combination, a side sill, the outer portion of the cross section of which is horizontally of Z shape, having the outer arm pointing downwardly and which, at one extremity, has its outer and downwardly extending arm cut away, and a body post erected on said sill upon the plane of the web of the Z section, which body post is provided with an extension downwardly to supplant the cut-away portion of the sill section and finish the end of the sill.

7. In a vehicle body frame in combination, a side sill having a cross section, the outer portion of which is horizontally of Z shape form having the outer arm pointing downwardly and which, at one extremity, has its downwardly-pointing arm and web cut away and a body post of channel section erected in the plane of the web of the Z section, and having the bottom and a side wall of its own section extended downwardly below the plane of the web of the Z to finish the extremity of the sill.

8. In a vehicle body frame in combination, a side sill of a cross section the outer portion of which includes an angle presenting upwardly and outwardly, and a body post having a bottom portion of a depth substantially equal to the width of the lower branch of said angle, said body post being erected in said angle section with the lower end thereof abutting and secured to said lower branch of the angle section and one side thereof contiguous and secured to the upper branch of said angle section.

9. In a vehicle body frame in combination, an inverted channel side sill extended through and forming the threshold of the door opening, and a body post erected on said side sill and provided with a lateral flange at its lower extremity by means of which it is secured to the outer wall of said channel side sill.

10. A vehicle body frame comprising a sill of a cross section including an angle presenting upwardly and outwardly, and a body post of channel cross section erected in the angle of said sill provided with a lateral flange secured to the upper vertically extending branch of said sill section and having its lower end abutting to the lower laterally extending branch of said angle section and welded thereto.

11. In a vehicle body frame in combination, a body sill of inverted channel section extending through and beyond the threshold of a door and forming the threshold of the door, and a body door post erected upon the outer side wall of said sill.

12. In a vehicle body frame in combination, a body sill of inverted channel section extending through and beyond the threshold of a door and forming the threshold of the door, and a body door post erected upon the outer side wall of said sill, together with means securing the inner and outer walls of said sill section together in the region of said post.

13. In a vehicle body frame in combination, a side sill, one portion of which is of inverted angle section presenting inwardly and downwardly, a seat support mounted on the upper branch of said angle section, and a body post interconnecting the lower branch of said angle section and said seat support.

14. A vehicle body frame comprising a side sill of a cross section including an angle portion presenting inwardly and downwardly, said sill extending through and forming the threshold of the doorway opening, a body post secured to the lower branch of said angle and a body post brace secured to the upper branch of said angle.

15. A vehicle body frame comprising a side sill, one portion of which is in the form of an angle presenting inwardly and downwardly, and the lower branch of which is provided with an outwardly extending flange, a body post erected on said flange, and a brace for the body post connected with the upper branch of said angle section.

16. A vehicle body frame comprising a body sill, a body post erected upon the sill, and a reinforcing lining for the post having an extremity deflected at an angle to the post and secured to the sill to serve as a brace for the post.

17. A vehicle body frame comprising a side sill of double Z section, the outer Z part of which is horizontally disposed and the inner Z part of which is vertically disposed, and a body post erected upon the web of the outer Z and secured to both the web and the inner arm of the Z.

18. A vehicle body frame comprising a side sill of inverted channel section which sill, at one extremity, has a portion of the outer side wall deflected outwardly and upwardly, and a conjoined side frame member having a lower portion of angle section underlying said sill and joined by one branch to the upturned side wall of said sill.

19. A vehicle body frame comprising a side sill of inverted channel section, the outer wall of which is longer than the inner wall, and a conjoined side frame member the lower portion of which is of angle section underlying said sill and presenting inwardly, and a junction strip between the lower branch of said conjoining member and the inner and shorter wall of said channel section of the sill.

20. In a vehicle body frame comprising a main body side sill, the cross section of which is of inverted channel form, and a post D bracket and tonneau sill each having a lower transverse section of angle form conjoined in overlapping relation to each other and to said main body side sill.

21. In a vehicle body frame comprising a main body side sill, the cross section of which is of inverted channel form, and a post D bracket and tonneau sill each having a lower transverse section of angle form conjoined in overlapping relation and forming a single angle which is conjoined in overlapped relation to said main body side sill, the branches of said angle being, respectively, connected to extensions of the side walls of the channel section side sill.

22. A vehicle body frame comprising a side sill of inverted channel section, and a post D bracket and tonneau side sill having lower portions of angle section underlying said channel section and presenting upwardly, and a cross brace removed from the extremity of said side sill and to which one at least of said post D bracket and tonneau sill is extended.

23. In combination in a vehicle body frame, a side sill having a cross section of inverted channel form, the inner wall of which is of less height than the outer, and body cross braces which, at their extremities, are deflected to connect the channel side walls of different height at intervals.

24. A vehicle body comprising a side sill, the outer portion of which is horizontal and is of a Z section with the outer arm of the Z pointing downwardly, and a door, the bottom of the body of which, when the door is shut, is accommodated in the angle between the web and the upper arm of the Z, and the overlap of which adjoins the lower arm of the Z.

25. A vehicle body comprising side sills of double-Z section, the outer Z of which is disposed horizontally with the outer arm extending downwardly, and the inner Z disposed vertically and is of a height less than the inner arm of the outer Z, a cross brace interconnecting the sills and of a height substantially equal to the difference in height between the outer and inner Z sections, and a door the body of which is accommodated in the angle between the web of the outer Z and its inner arm and is provided with an overlap conjoining the lower arm thereof.

26. A vehicle body side sill of substantially inverted channel shaped cross section throughout its main length, the inner wall of said channel being of less height than the outer wall thereof and both walls being provided with laterally extending flanges throughout said main portion of the body sill, the cross section of the forward portion of the sill being different from that of the main portion thereof by reason of the fact that the laterally extending flange of the outer wall is cut away.

27. A vehicle body side sill of substantially inverted channel cross section throughout its major length, the walls of said channel being provided with laterally extending flanges the outer of said laterally extending flanges terminating short of the rear end of said body sill, and the outer wall of said sill beyond the rear end of said outer flange extending vertically above the base of said inverted channel.

28. In a pressed metal automobile body construction, a forward extension for a body side sill comprising a triangularly shaped supporting member, said member being provided along its upper edge with an inturned flange extending rearwardly and downwardly, and a toe-board support of substantially Z-shaped cross section having one arm resting upon and secured to said flange.

29. A vehicle body construction comprising a body side sill including, in its outer portion, a horizontal outwardly extending flange the edge of which is turned downwardly and inwardly to form the bottom side edge of the body, and a door, the bottom of the body of which overlies said flange when the door is shut, and is provided with an overlap which abuts and covers the downturned edge of the flange.

30. In a vehicle body frame, a side sill having an outer portion of inwardly and downwardly presenting angle form, the upper horizontal arm of which forms the threshold of a door, and a door post applied and joined to the lower vertical arm of said angle form portion.

31. In a vehicle body frame, a side sill having an outer portion of inwardly and downwardly presenting angle form, the upper horizontal arm of which forms the threshold of a door and an inwardly presenting channel door post applied and joined to the lower vertical arm of said angle through a lateral flange on said post.

32. In a vehicle body frame, a side sill having an outer portion of inwardly and downwardly presenting angle form, the upper horizontal arm of which forms the threshold of a door, and an inwardly presenting channel post applied and joined to the lower vertical arm of said angle through a lateral flange on said post, and a brace joined to the side walls of the post deflected at its lower end, and joined to the upper horizontal arm of said sill.

33. In a vehicle body construction, a downwardly presenting channel sill having a portion adapted to overlie a chassis sill, and a rigid spacer member secured to the under side of said channel sill and interconnecting the side walls thereof, the sill being adapted to be joined to the chassis by means passing through a portion of the sill and said member.

34. A pressed metal side sill for vehicle body frames having a section in the form of an inverted channel, the outer wall of which is extended by an angle section presenting downwardly and inwardly, the outer arm of said angle section forming a door overlap, and the inner wall of said channel being provided with an inward extension forming with said inner wall a rabbet to receive the edge of a floor board.

35. A pressed metal side sill for vehicle body frames extending through and beyond the threshold of a door and being of angular form in cross-section, one arm extending horizontally and forming the threshold of the door, said horizontal arm being joined along its outer edge with an outwardly and upwardly facing angle portion adapted to receive the edge of a door, the outer edge of said angle portion being bent to provide finish at the lower edge of the body and adapted to be covered in the door opening by the door edge flange.

36. A vehicle body frame comprising a side sill having a cross section of inverted channel form and a conjoined side frame member having a lower section in the form of an angle presenting upwardly and inwardly, said inverted channel sill having its end portion overlap said frame member a substantial distance and having its outer and inner side walls joined respectively to the branches of said angle member to form therewith a box section joint structure.

In testimony whereof I hereunto affix my signature.

JOSEPH LEDWINKA.